United States Patent [19]

Janke

[11] Patent Number: 4,663,941

[45] Date of Patent: May 12, 1987

[54] REFRIGERATOR TEMPERATURE AND DEFROST CONTROL

[75] Inventor: Donald E. Janke, Benton Township, Berrien County, Mich.

[73] Assignee: Whirlpool Corporation, Benton Harbor, Mich.

[21] Appl. No.: 781,679

[22] Filed: Sep. 30, 1985

[51] Int. Cl.⁴ .......................................... F25D 21/06
[52] U.S. Cl. ........................................ 62/156; 62/227
[58] Field of Search ................ 62/156, 227, 229, 226, 62/228.1, 140, 155, 152, 162, 164; 236/47, 46 R

[56] References Cited

U.S. PATENT DOCUMENTS

| | | | |
|---|---|---|---|
| 3,483,919 | 12/1969 | Wakai et al. | 165/30 |
| 3,553,975 | 1/1971 | Sakamoto | 62/156 |
| 3,961,495 | 6/1976 | Beauvent et al. | 62/140 |
| 4,162,036 | 7/1979 | Balduzzi et al. | 236/47 |
| 4,294,081 | 10/1981 | Mitani et al. | 62/140 |
| 4,327,557 | 5/1982 | Clarke et al. | 62/153 |
| 4,354,547 | 10/1979 | Sugiura | 62/164 X |
| 4,433,555 | 2/1984 | Thorsen | 62/156 X |

Primary Examiner—Harry Tanner
Attorney, Agent, or Firm—Wood, Dalton, Phillips, Mason & Rowe

[57] ABSTRACT

A refrigerator temperature and defrost control according to the present invention includes means for sensing the temperature of a portion of cooling means within the refrigerator, means for determining when a particular frost load has accumulated on the portion of the cooling means, means coupled to the determining means for energizing defrost means for de-icing the portion of the cooling means when the particular frost load has accumulated and means coupled to the sensing means for de-energizing the defrost means when at least a portion of the frost load has been removed and for energizing the cooling means when the temperature of the portion thereof reaches a predetermined temperature during the time the defrost means is de-energized. The temperature and defrost control of the present invention makes multiple use various components thereof to reduce the cost and complexity of the control and to increase the effectiveness thereof.

30 Claims, 4 Drawing Figures

REFRIGERATOR TEMPERATURE AND DEFROST CONTROL

TECHNICAL FIELD

This invention relates to a control for operating components in a temperature-controlled device and more particularly to a temperature and defrost control for a refrigerator.

BACKGROUND ART

It has been recognized in connection with cooling devices that energy consumption and adverse temperature fluctuations within a refrigerated space can be minimized by periodically operating a defrost heater to defrost the coils of an evaporator when a predetermined frost load has accumulated thereon. In general, it is desirable to defrost as infrequently as possible, but it is not desirable to allow very large frost loads to develop because they require more time and electrical energy to remove, thus reducing the operating efficiency of the cooling device.

The cooling device is thus operated in two modes of operation, i.e. a cooling mode in which the cooling apparatus of the device is periodically turned on and off in dependence upon a user-adjustable set point and a defrost mode in which the evaporator coils of the cooling device are heated by the defrost heater to remove a frost load therefrom.

Various systems have been devised which calculate or otherwise determine when a defrost mode of operation should be initiated and terminated. For example, some systems accumulate compressor run time and initiate a defrosting operation when a predetermined amount of compressor run time has occurred since the last defrost operation. Other systems, for example as disclosed in Clarke et al U.S. Pat. No. 4,327,557, assigned to the assignee of the instant application, initiate a defrost operation at a time which is determined by taking into account various types of information, such as the number and duration of freezer and fresh food compartment door openings, the duration of the previous defrosting operation and the total accumulated compressor run time since the previous defrost operation.

Still further types of refrigerator controls include a latch circuit which initiates the defrost and cooling modes. A device, such as a frost sensor or timer, initiates the defrost operation by setting the latch circuit, which causes a defrost heater to be energized. A temperature sensor responsive to the evaporator reaching a predetermined elevated temperature resets the latch circuit to terminate defrost and begin a cooling mode by applying power to a compressor control circuit. During the cooling mode, the compressor cycling is controlled by the evaporator temperature sensor or an additional temperature sensor disposed within the refrigerated compartment. The temperature sensors, which may be thermistors, are each coupled to a transistor, the outputs of which are connected together in a logical sum configuration to in turn control the compressor. Such a control is disclosed in Sakamoto U.S. Pat. No. 3,553,975.

The above-noted Sakamoto patent also discloses that the compartment temperature sensor can be inhibited or prevented from operating the compressor when in the defrost mode by the use of a sensing line that changes state with the operational mode. Also disclosed is a sensing line for disabling a defrost terminate temperature sensor when the associated evaporator is not being defrosted which includes a diode that charges a capacitor to alter the voltage bias of the temperature sensor in the presence of an AC voltage on the sensing line.

Mitani et al U.S. Pat. No. 4,294,081 discloses a refrigerator which includes two independent temperature sensing circuits each comprising a temperature sensor, a pair of voltage comparators and a latch. One temperature sensing circuit operates the compressor when compartment temperature rises above a predetermined value and also terminates a defrost operation. The other sensing circuit energizes a defrost heater when frost builds up into contact with the sensor, provided the other sensing circuit is not energizing the compressor.

Wakai et al U.S. Pat. No. 3,483,919 discloses a refrigerator having a freezer thermistor coupled in series with one of a pair of bias resistors through a switch which is operated in dependence upon whether a cooling or freezing mode is selected. When the refrigerator is operated in the cooling mode, the switch couples one of the bias resistors to the freezer thermistor, in turn inhibiting control of the cooling apparatus by the freezer thermistor.

A still further type of defrost control is disclosed in Janke et al U.S. Pat. No. 4,530,218, issued July 23, 1985, entitled "Refrigeration Apparatus Defrost Control" and assigned to the assignee of the instant application. This control system utilizes a temperature responsive switch for switching the apparatus between defrost and cooling modes of operation. The temperature responsive switch is in turn controlled by a heater which is energized upon termination of a defrost cycle to positively effect transfer of the switch to a position which initiates the cooling mode of operation.

Other types of refrigerator controls have been devised for operating a refrigerator in low ambient temperatures. For example, Tershak et al U.S. patent application Ser. No. 588,304, filed Mar. 12, 1984, entitled "Apparatus and Method for Controlling a Refrigerator in Low Ambient Conditions", and assigned to the assignee of the instant application discloses a refrigerator control which inhibits operation of the cooling apparatus in the refrigerator for a period of time when an abnormal condition is sensed resulting from operation in low ambient temperatures.

SUMMARY OF THE INVENTION

The present invention comprises a refrigerator temperature and defrost control which makes multiple use of various components thereof to reduce the cost and complexity of the control and to increase the effectiveness of the control operation.

Specifically, a control for operating cooling means and defrost means in a refrigerator according to the present invention includes means for sensing the temperature of a portion of the cooling means, means for determining when a particular frost load has accumulated on a portion of the cooling means, means coupled to the determining means for energizing the defrost means when the particular frost load has accumulated and means coupled to the sensing means for both de-energizing the defrost means when at least a portion of the frost load has been removed and for energizing the cooling means when the temperature of the portion thereof reaches a predetermined temperature during the time the defrost means is de-energized. This latter operation is particularly desirable in low ambient temperature conditions which may cause an undesirable rise in the temperature of the freezer compartment of the refrigerator.

Also included in the control are means for sensing the temperature of a refrigerated compartment in the refrigerator and means responsive to both the temperature of the portion of the cooling means and the temperature of the compartment for controlling the cooling means. Specifically, the cooling means is energized when the defrost means is de-energized and the compartment temperature rises above a user-adjustable set point or, as noted previously, when the temperature of the portion of the cooling means exceeds a predetermined temperature.

In the preferred embodiment, each temperature sensing means comprises a thermistor disposed adjacent the evaporator or in the refrigerated compartment, a comparator having a first input coupled to the thermistor, a second input which receives a set point signal representing a predetermined temperature and an output which controls the de-energization of the defrost means and/or the cycling of the cooling means. Means are also provided in association with the evaporator temperature sensing means for establishing the level of the set point signal coupled to the comparator therein at a first magnitude during the time the control is in the cooling mode and for establishing the level of the set point signal at a second magnitude greater than the first magnitude during the time the control is in the defrost mode.

In the preferred embodiment, the evaporator and compartment temperature sensing means operate a power relay. This relay, in conjunction with a mode control switch controlled in part by an optical sensor which determines when the particular frost load has accumulated on the cooling means together control the application of power to the defrost means and the cooling means. When the mode control switch is in the cooling mode, energization of the relay causes power to be applied to the cooling means. When the mode control switch is in the defrost mode, energization of the relay causes power to be removed from the defrost means and the mode control switch to be reset to the cooling mode, the effect of which is to apply power to the cooling means.

The present invention comprehends the use of a single temperature sensing means, i.e. the evaporator temperature sensing means, to perform two very different temperature sensing functions during different modes of the control operation; that is, the evaporator temperature sensing means terminates a defrost operation when the evaporator temperature reaches a predetermined temperature and causes operation of the cooling means in a low ambient temperature condition to prevent a harmful rise in freezer compartment temperature.

DESCRIPTION OF THE PREFERRED EMBODIMENT

Figure 1:
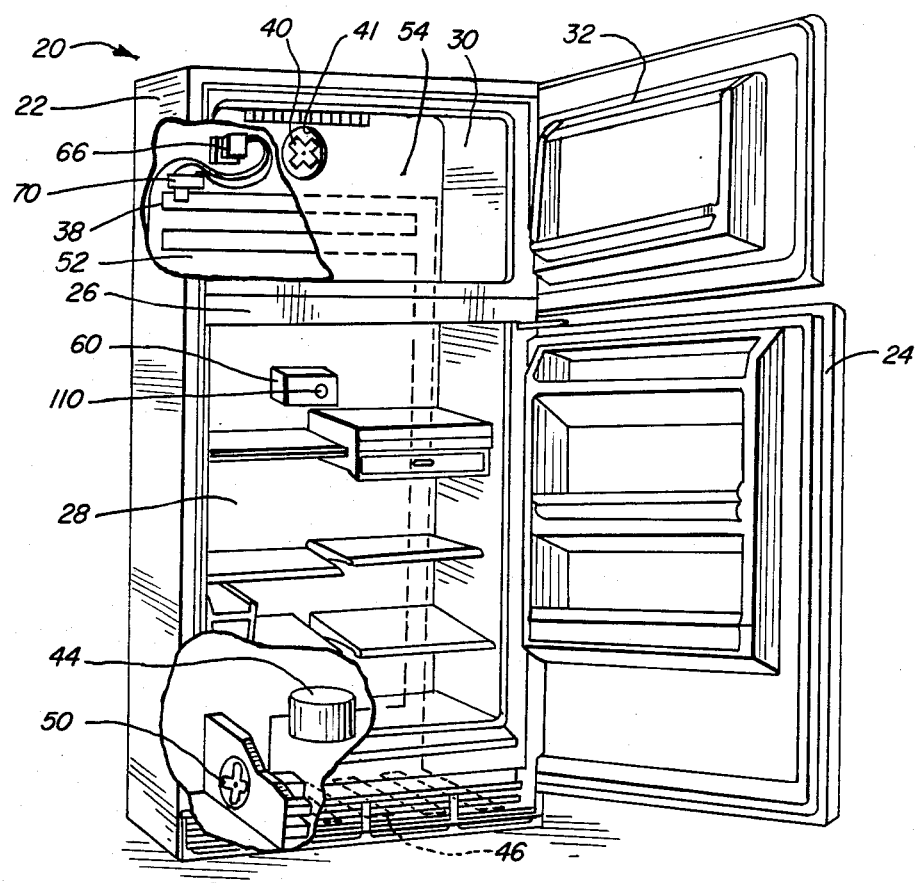
FIG. 1 is a perspective view with portions broken away of a refrigeration apparatus having a temperature and defrost control according to the present invention.

Referring now to FIG. 1, a refrigerator 20 includes a cabinet 22 which may enclose a plurality of refrigerated compartments cooled by a forced air refrigeration system. A fresh food compartment door 24 in conjunction with the cabinet 22 and a divider wall 26 enclose a fresh food compartment 28. A freezer compartment 30 is enclosed by the cabinet 22, the divider wall 26 and a freezer door 32.

Air is refrigerated as a result of being passed in heat exchange relationship with cooling means including an evaporator 38 and is forced by an evaporator fan 40 into the freezer compartment 30 through a discharge air duct 41. An additional duct (not shown) is provided in the divider wall 26 to effect cooling of the fresh food compartment 28.

The cooling means also includes a conventional compressor 44, a condensor 46 and an accumulator or header (not shown) interconnected through tubing to the evaporator 38 to effect the flow of refrigerant thereto. A condenser fan 50 circulates air through the condenser 46 and may be energized concurrently with the compressor 44 and the evaporator fan 40.

The evaporator 38 and the evaporator fan 40 are disposed within an evaporator compartment 52 which is enclosed by the cabinet 22 and a rear wall 54 of the freezer compartment 30.

Figure 2:
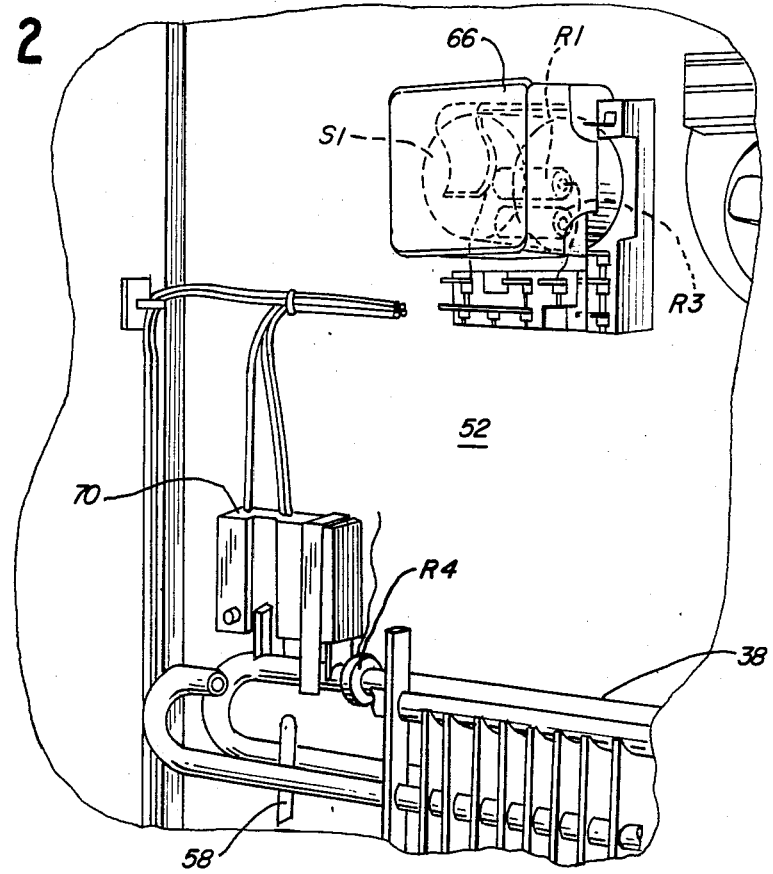
FIG. 2 is a fragmentary enlarged perspective view illustrating in greater detail a portion of the refrigeration apparatus shown in FIG. 1.

Referring also to FIG. 2, disposed between the coils of the evaporator 38 in the form of a loop is a defrost heater 58 which is periodically energized during a defrost mode of operation by the control of the present invention to de-ice the evaporator 38. The defrost heater 58 may be a conventional resistive heater that is energized directly from the AC line, as noted more specifically below.

A control circuit box 60 is disposed within the fresh food compartment 28 which, as noted more specifically below, encloses a portion of the circuitry for implementing the control of the present invention.

Disposed within the evaporator compartment 52 is a housing 66 which encloses a first thermally-operated switch S1, also referred to as a mode control switch, described in greater detail in connection with FIG. 3.

Figure 3:
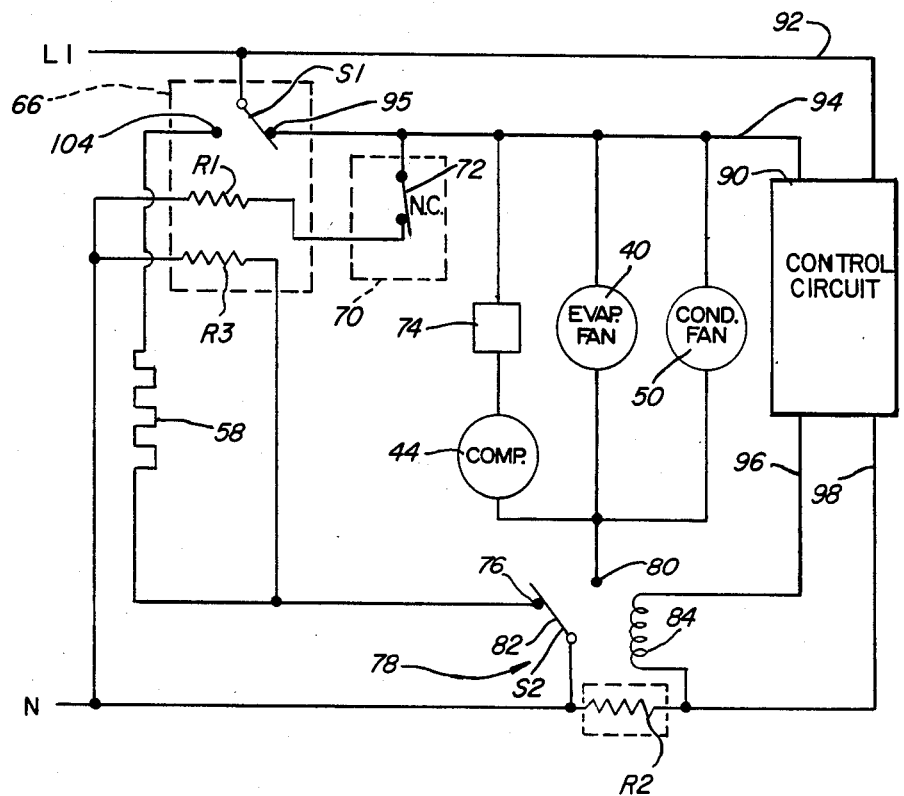
FIG. 3 is a combined schematic and block diagram of the temperature and defrost control according to the present invention.

Referring now to FIG. 3, there is illustrated a combined schematic and block diagram of the control according to the present invention. The control includes means for determining when a particular frost load has accumulated on a portion of the cooling means, in particular the evaporator 38. Such means comprises an optical frost sensor 70, such as the Altech RA3 optical frost sensor, FIG. 2, which is disposed adjacent the evaporator 38. The optical sensor 70 in turn controls a normally closed frost switch 72 shown in FIG. 3, which is coupled to a resistive bias heater R1. The resistive heater R1 is disposed in the housing 66 in heat-transfer relationship with the thermally-operated mode control switch S1 which is movable between first and second positions. In the first position, as illustrated in FIG. 3 and also referred to as the cooling mode position, a wiper of the switch S1 connects a first power conductor or line L1 coupled to an AC source of power (not shown) to one power terminal of each of the evaporator fan 40 and the condenser fan 50. The power conductor L1 is also coupled to one power terminal of the compressor 44 through a motor starting device 74. The switch S1, when in the second or defrost mode position, contacts a second terminal 104 which connects the line L1 to a first power terminal of the defrost heater 58.

A second power terminal of the defrost heater 58 is coupled to a first stationary contact 76 of a second switch S2 in the form of a power relay 78. A second stationary contact 80 of the power relay 78 is coupled to a second power terminal of each of the compressor 44, evaporator fan 40 and condenser fan 50. The power relay includes a movable wiper 82, the position of which is controlled by a relay coil 84. In the position shown in FIG. 3, the wiper 82 connects the seond power terminal of the defrost heater 58 to a second power conductor or line N coupled to the AC source of power. When in the position opposite to that shown in FIG. 3, the wiper 82 connects the second power terminal of the compressor 44, the evaporator fan 40 and the condensor fan 50 to the line N.

The relay coil 84 is coupled to one terminal of a power resistor R2, the other terminal of which is coupled to the power line N. It should be noted that the power resistor may be disposed outside of the cabinet 22.

The second power terminal of the defrost heater 58 is coupled through a resistive bias heater R3 to the power line N. The heater R3, like the heater R1, is disposed in the housing 66 and operates the thermally operated switch S1 in a manner described more specifically below.

Figure 4:
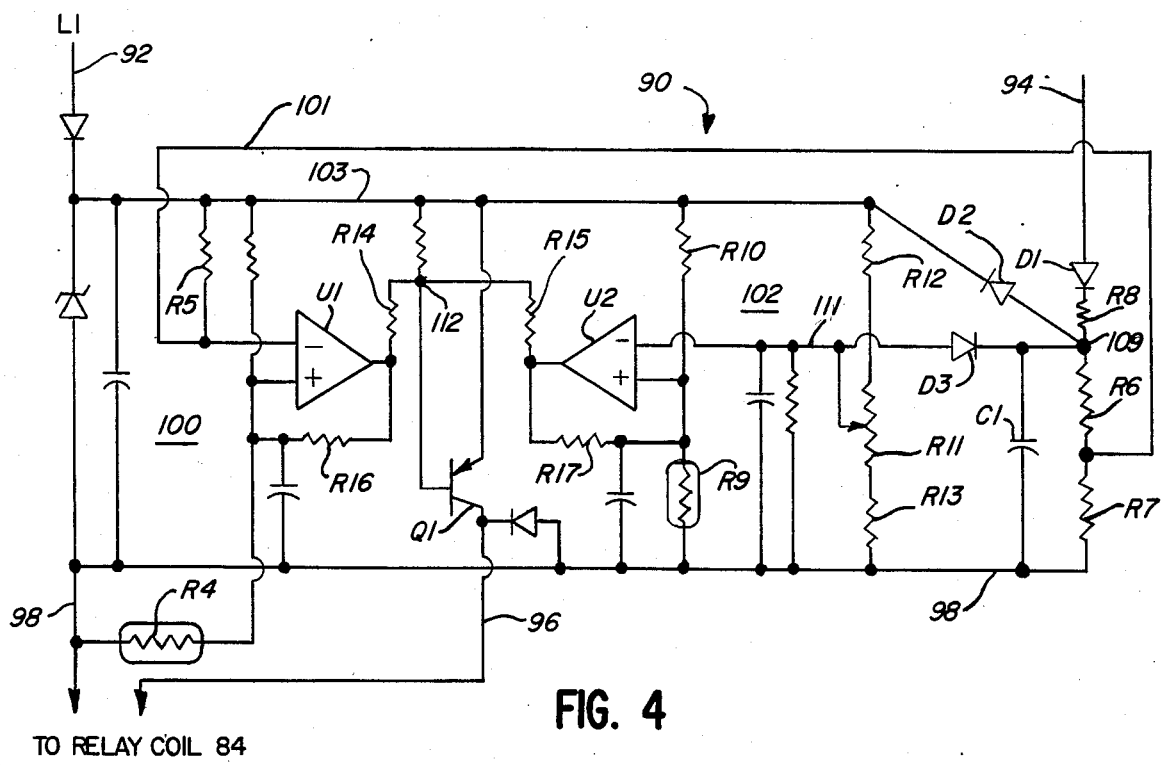
FIG. 4 is a schematic diagram of the components disposed within the control circuit box shown in FIG. 3.

The energized/de-energized condition of the relay coil 84 is controlled by a control circuit 90 which is illustrated in greater detail in FIG. 4.

The control circuit 90 includes first and second input lines 92,94 which are coupled to the power line L1 and to a first contact 95 of the mode control switch S1, respectively. A pair of output lines 96,98 are connected across the relay coil 84.

Also included is an evaporator temperature sensing means 100 which is responsive to the temperature of the evaporator 38 to produce an output signal when one of a pair of predetermined evaporator temperatures is detected. The control circuit 90 further includes a compartment temperature sensing means 102 which will produce an output signal during a cooling mode of operation when the temperature of the compartment 28 exceeds a predetermined compartment temperature.

The evaporator temperature sensing means 100 comrpises a first thermistor R4 which, as seen in FIG. 2, is disposed adjacent to, and preferably directly on the evaporator 38. The thermistor R4 develops a first temperature signal thereacross representing the temperature of the evaporator 38. The evaporator temperature sensing means 100 further includes, as seen in FIG. 4, a first comparator in the form of an operational amplifier, or op amp U1, having a first or noninverting input coupled to the thermistor R4 and a second or inverting input which receives a set point signal representing one of two predetermined evaporator temperatures.

The inverting input of the operational amplifier U1 is coupled by a line 101 to the junction between three resistors R5, R6 and R7. The resistor R5 is, in turn, coupled to a positive DC voltage line 103 while the resistor R7 is coupled to the output line 98. Resistors R5 and R7 thus form a voltage divider between the lines 103 and 98 establishing a first set point signal on the line 101 which is coupled to the inverting input of operational amplifier U1.

The resistor R6 is connected in series with a resistor R8 and a diode D1 to the input line 94. A junction 109 between the resistors R6 and R8 is additionally connected to the positive DC voltage line 103 through a diode D2.

When the mode control switch S1 is connected to the contact 104 when in the defrost mode position, there is no voltage present on the input line 94. While in the defrost mode position, the series combination of resistors R6 and R8 and diode D1 is effectively removed from the circuit so that the voltage divider consisting of resistors R5 and R7 provides the first set point signal at a first signal level to the inverting input of operational amplifier U1 as previously described.

Thus, the evaporator temperature sensing means 100 energizes coil 84 of relay 78 to terminate a defrost operation, while the mode control switch S1 is in the defrost mode position, when the signal across the thermistor R4 exceeds the first level representing a first evaporator temperature, such as 70° F.

When, however, the mode control switch S1 is connected to the contact 95 when in the cooling mode position, AC line voltage from the line L1 is connected to the input line 94. The series circuit of diode D1 and resistors R8, R6 and R7 causes a rectified AC voltage to be developed at the junction 109. A capacitor C1 filters the voltage at the junction 109. The diode D2 connected between the junction 109 and the line 103 is a clamping diode which prevents the voltage at the junction 109 from rising above the voltage on the line 103.

Thus, when the mode control switch S1 is in the cooling mode position, the junction 109 is at the same approximate DC voltage level as the line 103 which effectively connects the resistor R6 in parallel with the resistor R5. This parallel connection causes the first set point signal to change to a second signal level which is greater in magnitude than the first level but which corresponds to a lower temperature.

Hence, the line 94, diodes D1 and D2 and capacitor C1 comprise means for connecting the resistor R6 in parallel with the resistor R5 so that the second level is developed at the junction 109 when the switch S1 is in the cooling mode position.

Consequently, during the time the switch S1 is in the cooling mode position, the evaporator temperature sensing means 100 energizes the coil 84 of the relay 78 to cause operation of the cooling means when the signal developed across the thermistor R4 exceeds the second level representing a second evaporator temperature, such as 20° F. Such a condition may occur when the refrigerator is operated in low ambient temperatures, as noted more specifically below.

The compartment temperature sensing means 102 comprises a second comparator implemented by an operational amplifier U2 having a noninverting input coupled to the junction between a second temperature sensor in the form of a thermistor R9 which develops a signal representing presenting the temperature of the fresh food compartment 28 and a resistor R10. An inverting input line 111 connected to the inverting input of the operational amplifier U2 receives a second set point input signal from the wiper of a user-adjustable potentiometer R11 coupled in series with resistors R12,R13 between the lines 103 and 98. The user-adjustable potentiometer R11 includes an actuator knob 110 shown on the exterior of the control box 60 shown in FIG. 1.

The inverting input line 111 is additionally connected by a diode D3 to the junction 109. As previously noted, when the mode control switch S1 is in the cooling mode position, a DC voltage level is developed at the junction 109 which is clamped to the level of the voltage on the line 103 by the diode D2. The positive voltage at the junction 109 back-biases the diode D3 because it is more positive than the voltage developed at the wiper of the user-adjustable potentiometer R11. Therefore, the voltage on inverting input line 111 comprising the set point signal for operational amplifier U2, is established during the cooling mode at a first level (or range of levels) solely by adjustment of the user-adjustable potentiometer and is unaffected by the voltage at the junction 109.

However, when the mode control switch S1 is moved to the defrost mode position, the voltage on the line 94 drops to zero. This, in turn, causes the capacitor C1 to discharge through the resistors R6 and R7. As the capacitor C1 discharges, the voltage at the junction 109 decreases causing the diode D3 to be forward biased into conduction. This lowers the voltage on the inverting input line 111 so that the second set point signal for the operational amplifier U2 is at a second level less than the first level (or range of levels) during the defrost mode which corresponds to a higher temperature. In fact, the second set point signal for the operational amplifier U2 during the defrost mode is forced to a level that corresponds to such a high temperature level that the compartment temperature sensing means 102 is essentially inoperative, or inhibited, during the defrost mode.

The outputs of the operational amplifiers U1,U2 are coupled through resistors R14,R15 respectively, to a node 112. The node 112 is coupled to the base of a PNP transistor Q1, the collector of which is coupled to the output line 96. The operational amplifiers U1,U2 are therefore connected in a logical OR configuration whereby the op amps U1,U2 jointly control the transistor Q1 and hence the relay coil 84 of the mode switch 78.

It should be noted that the thermistor R9, the power relay 78 and the circuitry shown in FIG. 4 with the exception of the thermistor R4 are disposed in the control box 60 located in the fresh food compartment 28.

The operation of the control of the present invention will now be described with particular reference to FIGS. 3 and 4.

The position of the mode control switch S1 is controlled by the resistive bias heaters R1,R3, also shown in dotted outline form in FIG. 2 inside the housing 66. When current flows through either heater R1 or R3, heat is built up within the housing 66, in turn causing the wiper of the switch S1 to contact the terminal 95. On the other hand, if neither of the resistive heaters R1,R3 is conducting current, the temperature within the housing 66 falls, in turn causing the wiper of the switch S1 to contact the terminal 104.

During those times when the evaporator 38 is relatively frost free, the frost switch 72 of the optical sensor 70 is closed thereby causing heat to build up in the housing 66. This heat in turn causes the wiper of the switch S1 to contact the terminal 95. However, when a frost load of predetermined size has accumulated on the evaporator 38, the frost switch 72 of the optical sensor 70 opens which interrupts the current through the resistor R1, thereby causing the temperature within the housing 66 to drop, and eventually causing the wiper of the switch S1 to contact the terminal 104. This, in turn, connects the line L1 to one power terminal of the defrost heater 58, the second terminal of which is coupled through the contact 76 and wiper 82 of the switch S2 to the neutral line N. The defrost heater 58 is thereby energized and the cooling means are de-energized to initiate a defrost operation.

During the defrost mode of operation, the input line 94, FIG. 4, is disconnected from the power line L1. This, in turn, inhibits or disables the compartment temperature sensing means 102 and prevents this means from actuating the transistor Q1 and hence the relay coil 84. Further, the set point signal coupled to the inverting input of the operational amplifier U1 of the evaporator temperature sensing means 100 is established at the first level representative of a first predetermined evaporator tempeature, which as previously noted is equal to 70° F. In other words, when the defrost heater 58 has melted the ice on the evaporator coils and the evaporator temperature reaches this 70°0 F. threshold, a signal is produced by the operational amplifier U1 to turn on the transistor Q1 which in turn energizes the relay coil 84.

The evaporator temperature sensing means 100 therefore comprises defrost termination means for producing a defrost termination signal upon a determination that the energization of the defrost means is no longer desired.

Referring again specifically to FIG. 3, the relay coil 84, when energized, causes the wiper 82 of the relay 78 to contact the terminal 80, thereby disconnecting the power line N from the second power terminal of the defrost heater 58 and connecting the second power terminals of the compressor 44, evaporator fan 40 and condensor fan 50 to the power line N.

It should be kept in mind that immediately after the defrost operation has terminated, the wiper of the mode control switch S1 has not returned to the cooling mode position. This is due to the fact that the frsot switch 72 cannot supply current to the heater R1 during the defrost mode because the switch S1 is not in contact with the terminal 95. Hence, the cooling means comprising the compressor 44, evaporator fan 40 and condenser fan 50 are not energized at this time.

However, the movement of the wiper 82 out of contact with the terminal 76 causes a current to flow from the power line L1 through the wiper of the switch S1, the defrost heater 58 and the resistor R3 to the power line N. This flow of current through the resistive heater R3 causes the temperature within the housing 66 to rise, in turn eventually causing the wiper of the mode control switch S1 to move into contact with the terminal 95. This causes the power line L1 to be connected to the first power terminal of each of the compressor 44, evaporator fan 40 and condenser fan 50 to energize same. The control is now operating in the cooling mode.

During the cooling mode of operation, the input line 94 receives the AC voltage on the power line L1. This AC voltage enables the compartment temperature sensing means 102 by back-biasing the diode D3 and permits the operational amplifier U2 to control the transistor Q1 and the relay coil 84 to cycle the cooling means on and off in dependence upon whether the compartment temperature is greater than or less than a set point as determined by the setting of the user-adjustable potentiometer R11. Specifically, when the compartment temperature is greater than the set point, the relay coil 84 is energized to operate the compressor 44, evaporator fan 40 and condenser fan 50. When the compartment temperature is less than the set point, the relay coil 84 is de-energized to cause the wiper 82 to contact the terminal 76 and thereby disconnect the compressor 44, the evaporator fan 40 and condenser fan 50 from the power line N.

It should be noted that, when the mode control switch S1 is in the cooling mode position, the return of wiper 82 into contact with the terminal 76 will not cause the defrost heater 52 to energize since the switch S1 is not in contact with the terminal 104.

The AC voltage present on the line 94 during the cooling mode also causes the magnitude of the first set point signal coupled to the inverting input of the first operational amplifier U1 to change to a signal level representative of a second predetermined evaporator temperature, such as 20° F. During the cooling mode, therefore, the evaporator temperature sensing means 100 energizes the cooling means via the transistor Q1 and the relay coil 84 whenever the evaporator temperature rises above 20° F. This is desirable since this typically occurs in a low ambient temperature condition wherein the refrigerator 20 is operating in a room with a low ambient temperature. In this case, the low ambient temperature may cause the temperature of the fresh food compartment 28 to remain at an abnormally low temperature. However, during this time, the freezer temperature may rise to undesirable levels due to the infrequent cycling of the cooling means. Although the thermistor R4 is in proximity to the evaporator 38 and senses the temperature thereof, this temperature is a fairly accurate representation of the temperature within the freezer compartment 30 when the compressor and fans have been off for a long period, as occurs during a low ambient condition.

It is therefore desirable to operate the cooling means when the control is in the cooling mode irrespective of the compartment temperature sensing means 102 when the evaporator temperature sensing means detects an evaporator temperature greater than the second predetermined temperature.

The evaporator and compartment temperature sensing means 100,102, therefore, together comprise temperature control means for producing a cooling signal upon a determination that energization of the compressor is desired when the control is in the cooling mode.

If desired, resistors R16 and R17, FIG. 4, may be coupled between the output of each op amp U1, U2, and the noninverting input thereof to provide a hysteresis effect. This effect eliminates rapid cycling between high and low states in the op amp output when the signals at the inputs thereof would otherwise be approximately equal.

In summary, during the defrost mode of operation, the compartment temperature sensing means 102 is disabled and the defrost operation is continued until the evaporator temperature reaches a first predetermined temperature, as detected by the evaporator temperature sensing means. During the cooling mode of operation, either of the temperature sensing means 100,102 can operate the cooling means via the transistor Q1 and the relay coil 84. Specifically, cycling of the cooling means is normally accomplished by means of the compartment temperature sensing means 102 except when a low ambient temperature condition is encountered, in which case the cooling means may be energized by the evaporator temperature sensing means 100.

It should be noted that, in the preferred embodiment, the defrost initiate switch is thermally operated through the resistive heaters R1,R3 and is located in the evaporator compartment 52. This location is desirable since the defrost initiate switch S1 can terminate a defrost operation even if there is a failure in the components supplying current to the relay coil 84 or if there is a break in the relay coil 84 itself. In this event, even if the power relay 78 fails to energize at the predetermined temperature of 70° F., the warm evaporator will eventually cause the defrost initiate switch S1 to remove power from the defrost heater 58 in turn preventing dangerous overheating.

It should also be noted, however, that any switch capable of being set and reset in response to a condition other than temperature may be substituted for the thermally operated switch S1, although a thermal overload switch would then be needed in series with the defrost heater 58 to serve as a backup defrost termination switch.

It should also be noted that the power relay 78 may be replaced by a pair of solid state switches, if desired.

I claim:

1. In a refrigerator having a compartment, cooling means for cooling the compartment and a control for the cooling means, the control being operable in a cooling mode of operation and a defrosting mode of operation with the control alternating between said cooling and defrosting modes of operation, said control comprising:

temperature sensing means responsive to the temperature in a portion of said compartment to produce a temperature signal representative of said temperature in said portion;

set point establishing means responsive to said control for producing a first signal level corresponding to a first predetermined temperature during said cooling mode of operation and a second signal level corresponding to a second predetermined temperature during said defrosting mode of operation; and comparison means responsive to said temperature sensing means and said set point establishing means for producing an output when said temperature signal is equal to said first signal level during said cooling mode of operation and when said temperature signal is equal to said second signal level during said defrosting mode of operation.

2. The control of claim 1, wherein the set point establishing means includes a voltage divider for producing the set point signal levels.

3. The control of claim 2, wherein the voltage divider includes a pair of resistors connected in series whereby the first signal level is developed at the junction between the resistors.

4. The control of claim 3, further including means for connecting a third resistor in parallel with one of the pair of resistors when in the defrosting mode of operation to cause the second signal level to be developed at the junction.

5. The control of claim 4, wherein the selection of the mode of operation is controlled by a mode movable between a cooling mode position wherein the cooling means are cycled on and off in dependence upon the temperature of the refrigerated compartment and a defrost mode position wherein a defrost heater is energized to defrost a portion of the cooling means.

6. The control of claim 5, wherein the connecting means includes a diode connected between the mode switch and the third resistor wherein the third resistor is connected in parallel with one of the pair of resistors when the mode switch is in the cooling mode position.

7. The control of claim 6, wherein the diode receives an AC signal when the mode switch is in the cooling mode position which is rectified by the diode and wherein the connecting means further includes a capacitor coupled to the diode for filtering the rectified AC signal.

8. The control of claim 7, wherein the diode is disconnected from the AC signal when the mode switch is in the defrost mode position.

9. The control of claim 7, further including an additional diode coupled to the first diode for preventing the rectified and filtered AC signal from rising above a predetermined voltage.

10. The control of claim 1, wherein the comparison means comprises an operational amplifier having inverting and noninverting inputs coupled to the set point establishing means and the temperature sensing means, respectively.

11. In a refrigerator having cooling means for cooling a refrigerated compartment, defrost means coupled to the cooling means for defrosting a portion of the cooling means and sensing means for sensing the temperature of the portion of the cooling means, a control for operating the cooling means and the defrost means in accordance with the sensed temperature of said portion of the cooling means, comprising:
  means for determining when a particular frost load has accumulated on said portion of the cooling means;
  means coupled to the determining means for energizing the defrost means when the particular frost load has accumulated; and
  means coupled to the sensing means for de-energizing the defrost means when at least a part of the frost load has been removed and for energizing the cooling means when the temperature of said portion thereof reaches a predetermined temperature during the time the defrost means is deenergized including a power relay coupled to the cooling means and a control circuit for controlling the power relay, the control circuit including a temperature sensor for developing a temperature signal representing the temperature of the portion of the cooling means, a comparator coupled between the temperature sensor and the power relay for energizing the power relay when the magnitude of the temperature signal exceeds the magnitude of a set point signal and means for establishing the magnitude of the set point signal at a first magnitude during the time the cooling means is energized and for establishing the magnitude of the set point signal at a second magnitude greater than the first magnitude during the time the defrost means is energized.

12. In a refrigerator having cooling means for cooling a refrigerated compartment, defrost means coupled to the cooling means for defrosting a portion of the cooling means and sensing means for sensing the temperature of the portion of the cooling means, a control for operating the cooling means and the defrost means in accordance with the sensed temperature of said portion of the cooling means, comprising:
  means for determining when a particular frost load has accumulated on said portion of the cooling means;
  means coupled to the determining means for energizing the defrost means when the particular frost load has accumulated; and
  means coupled to the sensing means for de-energizing the defrost means when at least a part of the frost load has been removed and for energizing the cooling means when the temperature of said portion thereof reaches a predetermined temperature during the time the defrost means is deenergized including a power relay coupled to the cooling means and a control circuit for controlling the power relay, wherein the control circuit includes a first temperature sensor for developing a first temperature signal representing the temperature of the portion of the cooling means, a first comparator coupled between the first temperature sensor and the power relay for energizing the power relay when the magnitude of the temperature signal exceeds the magnitude of a first set point signal, a second temperature sensor for developing a second temperature signal representing the temperature of the refrigerated compartment and a second comparator coupled between the second temperature sensor and the power relay for energizing the power relay when the magnitude of the second temperature signal exceeds the magnitude of a second set point signal when the defrost means is de-energized.

13. The control of claim 12, wherein the control circuit further includes means for establishing the level of the first set point signal at a first magnitude during the time the cooling means is energized and for establishing the level of the first set point signal at a second magnitude greater than the first magnitude during the time the defrost means is energized.

14. The control of claim 13, wherein the second comparator is disabled when the defrost means is energized.

15. In a refrigerator having a compartment, cooling means including an evaporator for cooling the compartment and defrost means for applying heat to the evaporator, a control for the cooling means and the defrost means, the control defining a cooling mode in which the cooling means is cyclically operated and a defrost mode in which the defrost means is operated, the control comprising:
  evaporator temperature sensing means responsive to the temperature of the evaporator to produce an output when a predetermined evaporator temperature is detected;
  compartment temperature sensing means for operating the cooling means during a cooling mode in response to the compartment temperature exceeding a predetermined compartment temperature; and
  switch means responsive to the evaporator temperature sensing means output for changing the control to a cooling mode when the control is in a defrost mode and for operating the cooling means when the control is in the cooling mode irrespective of the compartment temperature sensing means.

16. The control of claim 15, wherein the predetermined temperature at which the evaporator temperature sensing means produced an output is different during the defrost mode than during the cooling mode.

17. The control of claim 15, wherein the evaporator temperature sensing means comprises a first thermistor coupled to one input of a first comparator having a second input which receives a signal representing the predetermined evaporator temperature.

18. The control of claim 15, further including means for initiating the defrost mode when a predetermined frost load has formed on the evaporator.

19. The control of claim 18, wherein the means the initiating the defrost mode includes an optical sensor disposed adjacent the evaporator and a switch controlled by the optical sensor for connecting the defrost means to a source of electrical power to energize same when the predetermined frost load has formed.

20. The control of claim 17, wherein the compartment temperature sensing means comprises a second thermistor coupled to one input of a second comparator having a second input which receives a signal presenting the predetermined compartment temperature, the outputs of the first and second comparators being connected together to jointly control said switch means.

21. The control of claim 20, further including means for disabling the second comparator when the defrost means is energized.

22. The control of claim 20, wherein the switch means comprises a power relay having a relay coil coupled to the outputs of the first and second comparators.

23. In a refrigerator having cooling means including an evaporator and a compressor for cooling a refrigerated compartment, the compressor having first and second power terminals, defrost means for heating the evaporator to remove frost therefrom, the defrost means having first and second power terminals, and a source of power coupled to first and second power conductors, an electrical control for controlling the application of power to the power terminals of each of the compressor and the defrost means, the control comprising:

defrost initiation means for producing a defrost initiation signal upon a determination that the energization of the defrost means is desired;

defrost termination means for producing a defrost termination signal upon a determination that the energization of the defrost means is not desired;

temperature control means for producing a cooling signal upon a determination that energization of the compressor is desired;

a first switch responsive to the defrost initiation means to assume a first condition electrically interconnecting the first power conductor to the first power terminal of the defrost means when the defrost initiation signal is produced;

a second switch responsive to the defrost termination means and the temperature control means, the second switch assuming a first condition electrically interconnecting the second power conductor to the second power terminal of the defrost means in the absence of both the defrost termination signal and the cooling signal, so that energization of the defrost means will occur if also the first switch is in the first condition;

the second switch assuming a second condition electrically interconnecting the second power conductor to the second power terminal of the compressor when the defrost termination signal is produced to de-energize the defrost means;

the first switch being responsive to the defrost termination signal to assume a second condition electrically interconnecting the first power conductor to the first power terminal of the compressor; and the second switch assuming the second condition when the cooling signal is produced to energize the cooling means if also the first switch is in the second condition.

24. The control of claim 23, further including inhibiting means responsive to the first switch in the first condition for inhibiting the temperature control means from producing a cooling signal.

25. the control of claim 23, wherein the defrost initiation means includes an optical sensor for detecting when a predetermined frost load has accumulated on the evaporator.

26. The control of claim 25, wherein the first switch is thermally operated and is disposed in an evaporator compartment of the refrigerator and wherein the optical sensor controls the current through a resistive heater element in heat-transfer association with the first switch.

27. The control of claim 23, wherein the defrost termination means comprises an evaporator thermistor disposed adjacent the evaporator, a first comparator having a first input coupled to the thermistor, a second input which receives a first set point signal representing a predetermined temperature and an output coupled to the second switch.

28. The control of claim 27, further including means for establishing the level of the first set point signal at a first magnitude during the time the compressor is connected to the power conductors and for establishing the level of the first set point signal at a second magnitude greater than the first magnitude during the time the defrost means is connected to the power conductors.

29. The control of claim 27, wherein the temperature control means includes a compartment thermistor disposed within the refrigerated compartment, a second comparator having a first input coupled to the compartment thermistor, a second input which receives a second set point signal representing a predetermined compartment temperature and an output coupled to the second switch.

30. The control of claim 23, wherein the second comprises a power relay.

* * * * *